United States Patent [19]

Sundermann

[11] 4,350,710
[45] Sep. 21, 1982

[54] METHOD AND AN APPARATUS FOR THE MANUFACTURE OF BAKED PRODUCTS, ESPECIALLY BREAD

[75] Inventor: Erich Sundermann, Brunswick, Fed. Rep. of Germany

[73] Assignee: Perfluktiv-Consult AG, Zurich, Switzerland

[21] Appl. No.: 119,829

[22] Filed: Feb. 8, 1980

[30] Foreign Application Priority Data

Feb. 12, 1979 [DE] Fed. Rep. of Germany ....... 2905284

[51] Int. Cl.$^3$ .............................................. A21D 8/02
[52] U.S. Cl. ....................................... 426/19; 426/27; 426/496; 426/504
[58] Field of Search ................... 426/19, 27, 456, 498, 426/502, 504

[56] References Cited

U.S. PATENT DOCUMENTS

| | | | |
|---|---|---|---|
| 1,254,494 | 1/1918 | Frost | 426/19 |
| 1,973,926 | 9/1934 | McCarthy | 426/27 |
| 2,549,595 | 4/1951 | Gregor | 426/19 |
| 3,161,523 | 12/1964 | Ort | 426/19 |
| 3,368,503 | 2/1968 | Gaylord | 426/19 |

Primary Examiner—Norman Yudkoff
Attorney, Agent, or Firm—Ernest F. Marmorek

[57] ABSTRACT

The application relates to a baking method, wherein the quantity of dough necessary for the making of a one-piece baked product is primarily divided into small-sized, approximately round dumplings having a diameter up to 34 millimeters and thereafter subjected to piece fermentation and to a primary baking process a time sufficient to permit the formation of a skin-like coating or of a beginning crust. These dumplings, if desired, after intermediate deep-freezing, storage and defrosting, respectively, are transformed into a single-layer or multi-layer heap arrangement or heap of bulk goods and exposed to the flowing action of hot gases and/or vapors in a second baking process until they are baked together, the gaps between the same are at least partially closed and crust formation has been completed.

27 Claims, 16 Drawing Figures

METHOD AND AN APPARATUS FOR THE MANUFACTURE OF BAKED PRODUCTS, ESPECIALLY BREAD

The invention relates to a method of manufacturing baked products, especially bread, from a dough prepared as a function of the flours respectively coarse meals and additives used, which after having been allowed to rest is divided, shaped and the individual pieces are subjected first to fermentation and subsequently to the baking process in the oven, and to an apparatus for carrying into effect the afore-mentioned method.

Generally, for the making of baked products, especially bread, a dough from grain flour or grain meal products and additives, such as water and dough raising agents, is mechanically kneaded and, in accordance with the assessment of the amounts of flour and liquid, is given a predetermined developing time before in the automatic manufacture of baked products it is divided into pieces, commonly by means of a dough dividing machine, the individual piece of dough being a primary product of the respective baked product, as for instance a bread or roll. After having been divided, the dough pieces are shaped and passed on to individual respectively final fermentation, from where they are fed to the baking oven.

In order to retain its desired shape during fermentation the dough piece must be inserted into an adequate receptacle. Hence, the continuous production of baked products calls for very expensive fermentation rooms, which for the heating of the large-sized dough pieces require a correspondingly great amount of energy so that, practically, the fermentation of the individual pieces with the known devices is not economically efficient.

Apart from special types of bread, such as rye whole meal bread or the like, the usual bread requires 30 to 50% and more of the baking time to attain the necessary temperature balance within the bread. In conventional bread baking different temperature zones are therefore formed in the interior of the bread. From the point of view of the quality of the bread products as well as with regard to economy and technique the formation of temperature zones is to be looked upon as a great drawback.

Due to water evaporation, the highest possible baking temperature in the interior of the baking goods remains below 100° C. Only in the crust will the temperature rise up to 200° C. An acceleration of heat transportation to the interior of the bread by increasing the baking temperature is therefore not possible.

The afore-mentioned heat transportation problem in the conventional baking process occurs equally in the refrigeration treatment of large-size baked products. For deep-freezing a bread of respective size and sponginess there are required up to 5 hours. Here, too, economical, technical and, first of all, qualitative drawbacks are involved due to the retrogradation of the starch within the baking goods in the temperature range of from +16° C. to −7° C., as within this temperature zone staling is provoked.

Due to their sensitivity, the dough pieces, after having passed fermentation, must in the conventional method be transferred to the baking oven without appreciable delay to receive therein their final volume by oven raising and an outer baking crust. Practically, bread baking goes on without interruption from the preparation of the dough up to and including the baking process.

At times, it is also so proceeded that after completion of 80 to 90% of the baking time the baking process is interrupted. By finishing the baking after an intermediate storing time fresh bread can be offered to the consumer. By such procedure the baking time will be altogether prolonged.

If for instance during the primary baking process the baking time is reduced by 12 minutes, then it will take 24 minutes for finishing the baking, so that the total baking time will be considerably prolonged. This means that in this method the manufacturing process, which is of very long duration anyway, is additionally extended, a fact resulting in a correspondingly greater energy consumption.

It is the objective of the present invention to so improve a method for the making of baked products, especially bread, of the type as initially described that an improved and economical fermentation of the shaped pieces, a favourable solution of the heating and refrigerating problems regarding transportation within the goods to be baked combined with a reduction of the baking time and a reduction of the refrigerating path, an increase of the crust component and an interruption of the manufacturing process prior to completion of the baked product are obtained, so that within a short period of time freshly baked products can be made from an intermediate product capable of long-time storage, said product having, in addition, a large proportion of a palatable crust.

For solving the above indicated problem, the initially described method is characterized in that the dough, after having been allowed to rest, is divided or separated into shaped separate portions, hereinafter referred to as dumplings, having a diameter of about 8 to 34 millimeters, preferably 10 to 24 millimeters, and that the dumplings introduced in one layer into molding troughs are exposed to flouring gaseous and/or vaporous thermal media in the fermentation room and thereafter subjected to a first or primary baking process until they have reached a state of form stability, with either a skinlike coating being formed or a crust beginning to develop, and that the dumplings thus treated are arranged into a heap hot gases and/or vapours passing through the heap until the dumplings are baked to one another and the gaps are partially or fully filled, and which is subjected to the second baking process a time sufficient to complete crust formation.

By dividing the dough into pieces having a diameter of from about 8 to 34 millimeters, preferably 10 to 24 millimeters, the piece fermentation procedure is rendered more satisfactory, so that the periods necessary for completing piece fermentation can be reduced by up to 50% and more as compared to the conventional baking methods for bread. This makes it possible that the comparatively small dumplings can be accomodated in directly adjacent molding troughs, meaning that a great number thereof can be received within a comparatively small space, especially in cases where piece fermentation is performed not only in juxtapositioned molding troughs but also in troughs spaced above each other.

By the subsequent primary baking process up to a state of form stability or up to the beginning of crust formation, respectively, the dumplings are transformed into an intermediate product which can be further processed in the described manner either immediately afterwards or at a later time after intermediate storage, namely, in that the dumplings are arranged into a bulky heap which by means of hot gases and/or vapours is subjected to a second baking process.

Heating of the stabilized dumplings takes place very uniformly both in the interior of the heap of bulk goods and at the marginal zones, the gas flow within said heap as well as the large inner surface of the heap ensuring an especially favourable heat transmission. The transmission of heat is increased even in that eddies of extremely high speed occur in the gaps between the dumplings. The heat transmission of this directional current is superior to any other heat transmission, so that the second baking process can likewise be carried out within a substantially shorter period of time than is possible with the conventional baking process.

Humidity in the baking atmosphere and its employment in the baking process are of great importance. In the method according to the present invention the moisture content of the thermal medium is of extraordinary importance, not only in connection with the manufacture of the intermediate product, but also for the second baking process. The binding capacity of the dumpling depends, inter alia, on a specific moisture content of the surfaces thereof.

Moistening of the surfaces of the dumplings may be performed either prior to or during the second baking process by the circulating thermal medium which must possess a high atmospheric humidity. If desired, saturated or overheated vapour may be used for this purpose. It will be expedient in the second baking process to cool the surfaces of the dumplings at intervals down to a surface temperature of below 100° C., to humidify the same at such temperatures by gaseous and/or vaporous thermal media having a high moisture content and, after humidifying, to immediately expose their surfaces again to the predetermined temperature required for the baking process by the thermal medium.

Cooling takes place at the marginal zones of the dumplings only; it penetrates to a small depth of the dough layer only. Due to the velocity of flow of the thermal medium, cooling can be performed within a few seconds. Reheating after cooling to the necessary baking temperature can again be performed within a few seconds by the flowing thermal medium. By so conducting the process that cooling and heating of the surfaces is performed at intervals there is obtained a progressive partial binding between said surfaces.

If after the primary baking process the dumplings have developed on their surfaces a skin-line coating or a beginning crust, baking together in the oven at an adequate temperature and with the required humidity and velocity of the hot gases and/or vapours can result in completely filling in the interspaces between the dumplings, said filling action being combined with an increased crust formation in the marginal zones of the dumplings, so that a crust is obtained not only in the exterior zone of the product to be baked, but also in the interior thereof, which consists of a plurality of dumplings. The final state is thus to the effect that a uniform structure throughout the entire cross-section of the baked product is obtained.

But if, on the other hand, the primary baking process has been carried out to a point where the dumplings show already a marked crust on their surfaces and where the crumb within the dumpling is already done, the result will be that, apart from a further crust formation on the surface of the dumplings, the gaps between the same are only partially filled in, with the crust zones of the individual dumpling being considerably more distinct and the structure of the baked product being less homogenous, a state which in many cases, for instance for the making of rolls with as great as possible a crust component, may be absolutely desirable.

It is further possible that after the primary baking process the surfaces of the dumplings are damaged in some way, either by scratching, pricking or cutting in point-shaped, straight or curved form. Such damages on the surface of the dumplings lead in the subsequent second baking process to the result that the increase in volume of the dumpling caused by the treatment in the oven will not be hindered by a closed outer skin or crust. By the damaged surfaces of the dumplings the interior thereof can during the second baking process penetrate to the gaps, fill in the same and join the surfaces defining the gaps together by baking.

The dumplings shaped out of the dough after the latter has been allowed to rest may have a great variety of different configurations. These depend on the devices with which they are shaped. For the manufacture of baked products for which a great crust component is desirable and which do not call for homogeneity, it may be quite expedient to use dumplings having distinct corners or edges. In general, however, especially with a view to arriving at a homogeneous structure of the finished baked product, it is desirable to divide the dough, after having been allowed to rest, into dumplings of approximately spherical shape or to transform the same into such spherical shape, if previously they had been divided to assume other shapes. The spherical shape offers the advantage that the distance to be covered by the heat from surface to center during piece fermentation and in the primary baking process is equal at all points so that a substantially uniform and rapid heating of the dumplings can be attained with only short heating periods being required. Furthermore, the spherical shape offers a gap volume of greatest uniformity, when the dumplings received from the primary baking process are transformed into a bulk heap, thereby creating especially favourable flowing conditions for the hot gases and/or vapours during the second baking process. Finally, the spherical shape is also distinguished by the greatest static strength and for this reason is to be preferred.

It is known that doughs made from different sorts of flours, such as wheat, rye or mixtures thereof, have very varying flavours. For this reason, mixed bread from wheat and rye is made, of which the components of wheat flour and rye flour can be varied according to taste.

Instead of producing dumplings of the described type from mixed flour, there may be produced according to the present invention a final product having similar properties in that the dumplings from a strand of dumplings are provided with an outer enveloping layer made from another dough. For instance, it is possible to use for the enveloping layer a dough developing an especially delicate crust, whilst the dough component in the interior of the dumpling results in a considerable increase in volume during the primary and the second baking process, respectively, so that the volume of each dumpling is small compared to the volume of the final product. By the selection of the two components forming the dumpling both the taste and the baking characteristics can be influenced, the percentage of the two components being additionally variable.

It will be expedient to heat the dumplings in the piece fermentation process for the manufacture of bread and rolls to a temperature of from 30° to 50° C., adhering at the same time to a relative atmospheric humidity of the vaporous respectively gaseous thermal medium of from 50 to 90% and to a flow velocity of the thermal medium of from 0.3 to 1 m/s. By dividing the dough into small portions to form so-called dumplings and by storing the same on molding troughs or in molding troughs when large contact surfaces are involved, and by applying the above indicated temperature, the dough pieces or dumplings, respectively, reach a looser consistence than is the case with the conventional method and there are thus also attained the above mentioned very short fermentation times, thereby arriving at a respective speeding up of the manufacturing process.

For baked products of the conventional type, for instance bread, the first or primary baking process can be reduced to a period of from 80 to 180 seconds. In cases of special demand, for instance as regards the encrustation of the dumplings, the primary baking process may be extended to 10 minutes. If specific baked products are involved, which are subject to longtime substance transformations, the primary baking process can be further extended.

Depending on the composition of the dough, on the type of the desired baked product, the dimensions of the dumplings and the duration of heat application, the baking temperatures of the primary baking process range from 130° to 400° C. Within this temperature spectrum of the primary baking process the various baked products are subject to differential processing requirements.

In the described process heating or cooling of the dumplings for the primary baking process or thereafter can be performed in a shocklike manner by overcharging the temperature of the gaseous and/or vaporous thermal medium. By this possibility of thermal control oven raising and surface texture of the dumplings can be influenced much more precisely than is the case at present with the conventional baking process.

It may be so proceeded that the dumplings are moved at a high inherent heat directly from the primary baking process to the second baking process. The main baking temperature of the second baking process ranges between 160° and 230° C.

According to the type of the baked product and also for influencing the flavour, in the second baking process there can be used only dumplings of approximately equal dimensions or of different sizes arranged, if desired, in predetermined sequence.

As far as bread is concerned, a uniform size is generally used for the dumplings. If dumplings of differential diameters are used for a baked product, this influences the flavour and in an unusual manner adds to the enjoyment of the baked food. If for instance rolls are made of which one layer is composed of larger dumplings and a superposed layer consists of smaller dumplings, then the taste of the layer with the small dumplings is different from that of the layer with the larger dumplings. Two reasons account for this phenomenon. One reason is that the contents of the dumplings are very diverse and the other reason is that the interior of the smaller dumpling was to a much greater extent exposed to the heat in the second baking process. The volume of a dumpling having a diameter of 8 millimeters is 64 times smaller than the volume of a dumpling having a diameter of 34 millimeters.

A further embodiment of the process provides that after the primary baking process solid ingredients, such as poppy seed, sesame, caraway seed, or such ingredients as pumpernickel crumbs, crushed grain, are applied onto the surfaces of the dumplings by means of starch glue or the like. During the second baking process these solid ingredients are transferred into the interior of the bread. Up to the present, especially the so-called mixed bread permitted variations as to flavour. Mixed bread is prepared for instance by mixing wheat and rye flours. By the instant procedure it is possible with various grain flour products to reach effects in quite a different way: For instance a dumpling whose interior consists of a crumb from wheat flour and whose surface consists of pumpernickel crumbs leads to one of the strongest variations in flavour ever obtained in baked products from mixed meal. A further embodiment of the process provides that prior to the second baking process the dumplings are blended with ingredients in the form of larger lumps, such as desiccated fruit, nuts or the like. The surfaces of the dumplings permit that the crust can act as supporting structure within the bread, meaning that the lumpy heavier ingredients are supported by said structure so that they are prevented from sinking.

If the dumplings withdrawn from the primary baking process are not immediately subjected to further processing, they can with or without shock cooling to a temperature of −18° C. be stored in a deep-freezing plant. By such deep-freezing storage it has become possible to provide and maintain a supply of dumplings, from which the desired amounts of intermediate products can at any time be withdrawn and further processed within a very short time in the second baking process to obtain baked products fresh from the oven. The baked products prepared from the deep-frozen dumplings show no difference as compared to dumplings processed immediately after the primary baking process.

In order to improve the binding property of the surfaces of the dumplings, the latter may be wetted or sprayed prior to the second baking process with a starch glue, especially prepared from drinking water and starch, the content of the starch ranging from 3 to 10% related to the drinking water, or with other substances having adhesive properties and serving for human nutrition, such as sugar, honey, treacle or the like.

For the second baking process the dumplings may be conveyed through the baking zone in a bulky heap in the form of a continuously moved strand by supporting means capable of being flown through by hot gases or vapours in a direction transversely of the strand, said strand being divided after the second baking process. Or, otherwise, for the manufacture of some baked products, such as bread, milk bread or the like, the dumplings may for the second baking process in a bulky heap be introduced into a mold capable of being flown through by hot gases and/or vapours and having a perforated bottom like a sieve and impermeable lateral walls, and rigidly supported in said mold and fed to the baking zone within said mold. For the second baking process it is recommendable to adjust the inflow and outflow velocity of the hot gases or vapours for passing through the heap of bulk goods to values ranging from 0.5 to 4 m/s. The flow velocity within the heap of bulk goods amounts to a multiple of the flow velocity in the free cross-section. These flow velocities result in an especially favourable heat transmission to the dumplings within the bulky heap.

The heap of bulk goods can be flown through in one direction only or alternatingly from opposite directions. The flow of the gases or vapours through the heap of bulk goods can also be carried out at intervals.

The temperature spectrum of the second baking process for the conventional baked products ranges between 80° and 400° C. Between 80° and 90° C. moistening of the dumplings takes place. The main baking temperatures range between 150° and 240° C. Higher temperatures up to 400° C. are used for special types of bread, for instance barley bread. By the method here discussed there can be made for instance within 5 to 20 minutes a considerable amount of conventional fresh baked products, such as bread and rolls. The same amount will take about 45 to 60 minutes according to the conventional baking process, comparing for instance the baking procedures for bread having a weight of from 1.000 to 1.500 g.

As regards specific baked products, for instance whole-meal rye bread, which due to the retarded chemical reactions require prolonged baking periods, no additional baking times in the second baking process are needed. The necessary prolongation of the baking time takes place either in the primary baking process or in a subsequent baking process. The specific goods to be baked are then subjected to a temperature corresponding approximately to the conventional baking temperature of said specific goods. In a subsequent baking process the goods may be subjected to a further baking treatment at temperatures of from 100° to 170° C.

Apparatuses for carrying into effect the new method proceed from the known constructions comprising a kneader for the dough, a mixing and dosing device for the flour and the additives arranged ahead of the same and a subsequently arranged fermentation room for primary fermentation, a dough divider and a fermentation room for piece fermentation and a baking oven capable of being flown through by the thermal medium. In this afore-mentioned embodiment provision is made according to the present invention that the dough dividing machine has one or a plurality of extruding channels which in the outlet area, at least in one direction, have only a width of from about 8 to 34 millimeters, preferably from 10 to 24 millimeters, and that molding trough plates capable of being stacked in spaced relationship on top of each other and comprising molding troughs are provided, that for piece fermentation and for the primary baking process of the dumplings there is provided a fermentation and baking cupboard comprising chambers laterally extending over the height of the shaft for inlet and outlet of the thermal medium and a means for removing the respective lowermost molding trough plates of the stack, and that the baking oven is provided with chambers for passage of the thermal medium and with conducting means for said passage through the heap(s) of the bulk goods to be introduced into said chambers.

The strand of dough leaving the dough dividing machine possesses already the desired dimensions of the dumplings in one direction, so that a division of said strand into dumplings of the desired dimensions can be performed with simple means, depending on the dimensions of the strand in the other direction. The separation of the strand issuing from the dough dividing machine into individual dumplings is expediently performed directly above the stacked molding trough plates, so that the individual dumplings are received in the respective molding troughs, where they remain until the primary baking process is completed. Piece fermentation and the primary baking process are performed in a fermentation and baking cupboard having a stacking shaft for the molding trough plates, so that a great number of dumplings can be processed within a closely confined space and continuous fermentation and primary baking process can be carried out, in which by means of the chambers laterally extending over the height of the shaft feeding and discharging of the thermal medium into the fermentation zone and into the primary baking zone can be separately performed.

Further details regarding the construction of the dough dividing machine and the associated means for subdividing the issuing dough strand(s) into individual dumplings, of the cupboard for fermentation and the primary baking process and of the baking oven are set forth in the subclaims and will become apparent as the description proceeds, when taken in conjunction with the accompanying drawings, wherein FIG. 1 shows a diagram regarding the operation of the new method;

Figure 1:
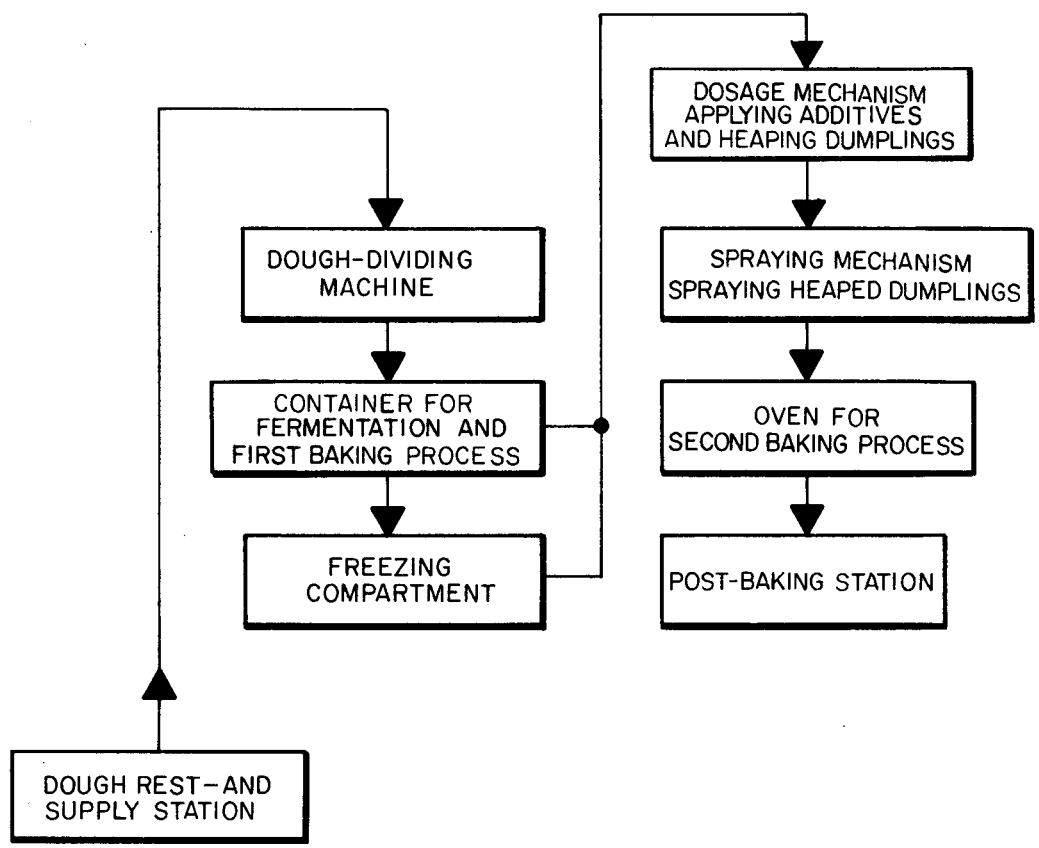

It can be seen from FIG. 1, that the dough, after having been allowed to rest, is transferred to a dough dividing machine. In said machine the dough is divided into dumplings having a diameter of from 8 to 34 millimeters, preferably 10 to 24 millimeters, it being so proceeded that said dumplings are transferred to molding troughs which, if desired, may be perforated, and which in the following operational step of fermentation are introduced into a cupboard wherein also the subsequent primary process is performed.

The dumplings which in the primary baking process have been stabilized and subjected to heat treatment a period sufficient to form a beginning skin-like coating or crust formation can be transferred to a refrigerating shaft, from which they can on demand be removed and directly fed to a dosing means for the second baking process.

In cases where the dumplings withdrawn from the primary baking process are to be immediately further processed, they are transferred from the cupboard for the primary baking process directly to the dosing means and from there onward into the oven for the second baking process. From the oven the finished baked products can be transferred either to a subsequent baking device or directly to a store comprising a respective means for discharging the same.

According to the demand for a final baked product, or finished baked products, it is either possible to feed the entire amount of the dumplings derived from the primary baking process via the dosing means to the oven for the second baking process or, else, part of the dumplings or the entire amount thereof can be moved from the primary baking process into the refrigeration shaft, from which they can at any time be withdrawn again and, after defrosting, moved on via the dosing machine to the oven for the second baking process. Defrosting can be performed within a short period of time, because the dumplings are of small dimensions so that the heat can immediately penetrate to the interior of the dumplings. The duration of the second baking process is likewise reduced to a very short period of time as compared to the baking process known up to the present, so that it is possible to produce from the supply of dumplings stored in the refrigerating shaft fresh baked products or bread, rolls or the like within less than 20 minutes.

Transformation of the dough into dumplings by means of the dough dividing machine can be performed in different ways.

Figures 2, 3:
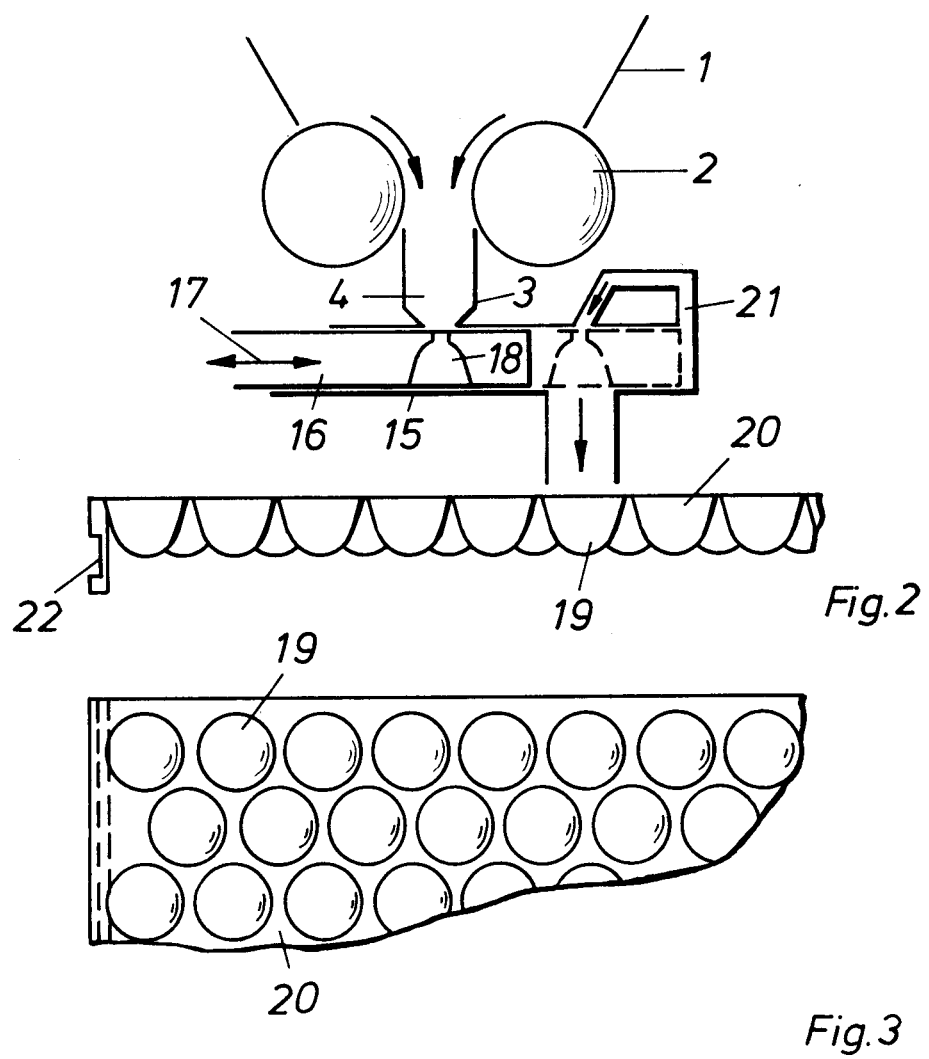
FIG. 2 shows another dough dividing machine in conjunction with a plate comprising molding troughs.
FIG. 3 is a partial plan view of the molding trough plate according to FIG. 2.

According to the arrangement as shown in FIG. 2 a funnel 1 of the dough dividing machine is provided in connection with discharge rollers 2, which are followed by a press channel 3 surrounding a chamber 4. The chamber 4 is not closed at the bottom, but opens into a slide valve casing 15, wherein a slide 16 is provided with a recess 18 which in the position shown in full line in FIG. 2 is filled with dough, so that a dumpling is formed in said recess which, when the slide 16 is moved into the position shown in dotted lines, is transferred from the slide into a molding trough 19 of a molding trough plate 20. The extrusion of the dumpling is promoted by an impact of compressed air in the air channel 21 produced by the slide 16.

The arrangement according to FIG. 2 can be provided also in the form of a multiple arrangement in the described manner.

From FIGS. 2 and 3 there can be deduced an embodiment of the molding trough plate 20. The plate comprises the aforementioned molding troughs 19 which are arranged closely adjacent each other.

The molding trough plates are provided with two lateral frame portions 22 which permit stacking of the plates 20.

Gaseous or vaporous media are allowed to flow below the molding trough plate and at the same time sweep over the surface of the underlying molding trough plate.

Figure 4:
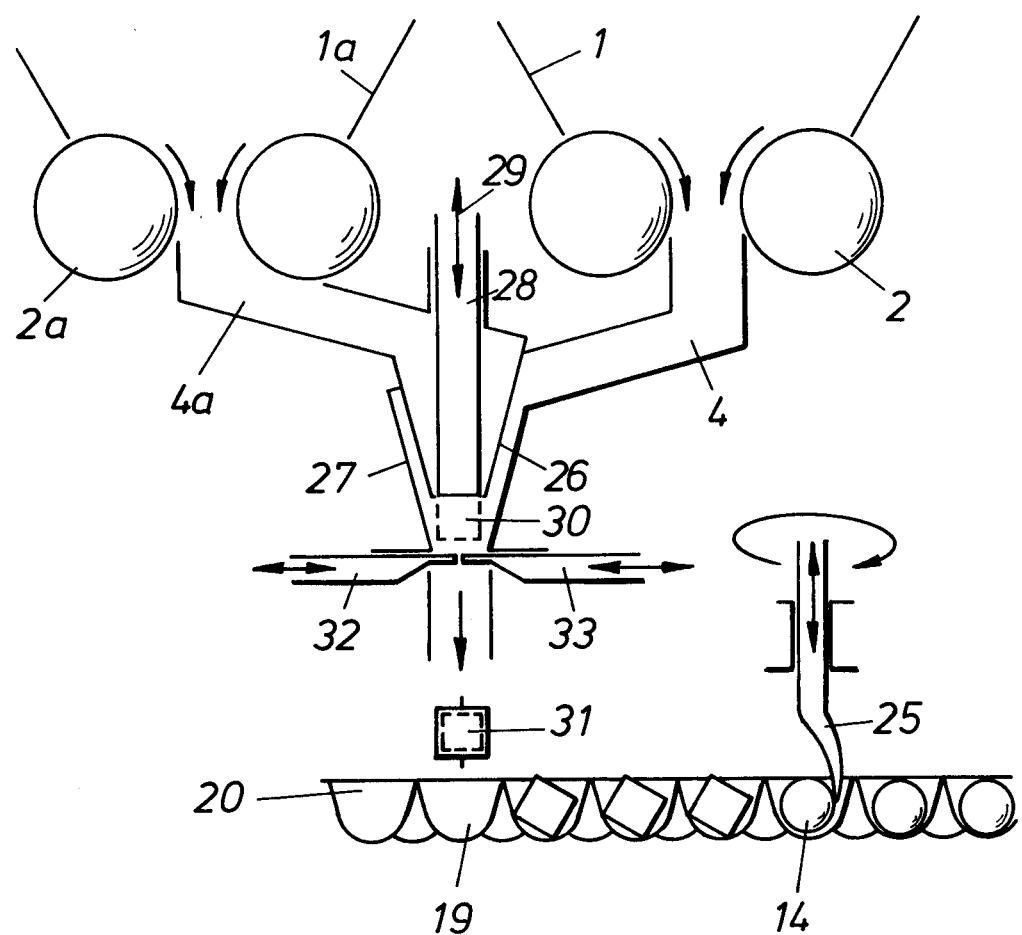
FIG. 4 shows a modified form of the dough dividing machine.

In the arrangement according to FIG. 4 there are provided two funnels 1 and 1a to be filled with dough supply, which are equipped each with discharge rollers 2 and 2a, respectively, connected with extruding channels 4 and 4a, respectively, said extruding channels opening into end portions 26 and 27 arranged concentrically to each other. A lifting plunger 28 capable of being lifted and lowered in the direction of the double arrow is guided in the end portion 26, so that as a function of the lifting movement of the plunger 28 one dough dumpling 30 each can be extruded in the shape as shown in dotted lines, which dumpling is then enveloped by the dough fed through the end portion 27, thus forming a completely enveloped dumpling 31 which by means of the slides 32 and 33 movable toward each other can be separated from the following compound strand of the dough and transferred to the molding trough plate 20 respectively into the troughs 19 provided therein.

The dough funnel 1 may for instance contain a rye dough and the dough funnel 1a may contain a wheat dough, so that the dumplings have a core of wheat dough and an envelope of rye dough. By means of a diagrammatically represented rotating means 25 the dumplings can be transformed into balls 14.

The dumplings made from two different kinds of dough are especially suited for the making of bread or other baked products for which a great crust component in the dumpling is desirable.

Figure 5:
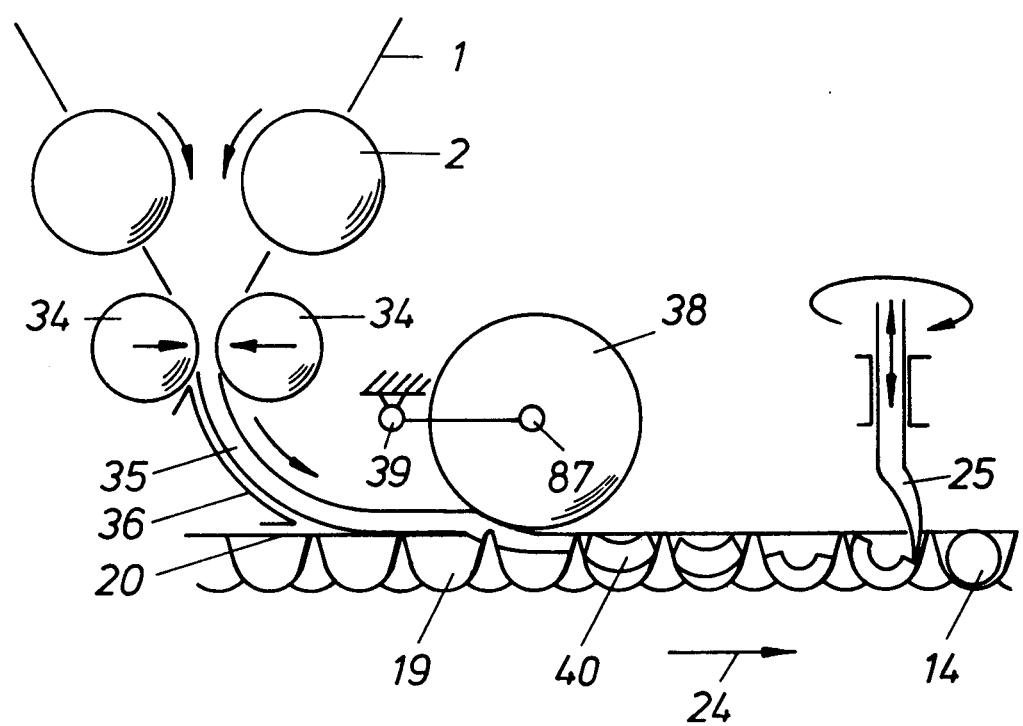
FIG. 5 shows a further variation of the dough dividing machine.
Figure 7:
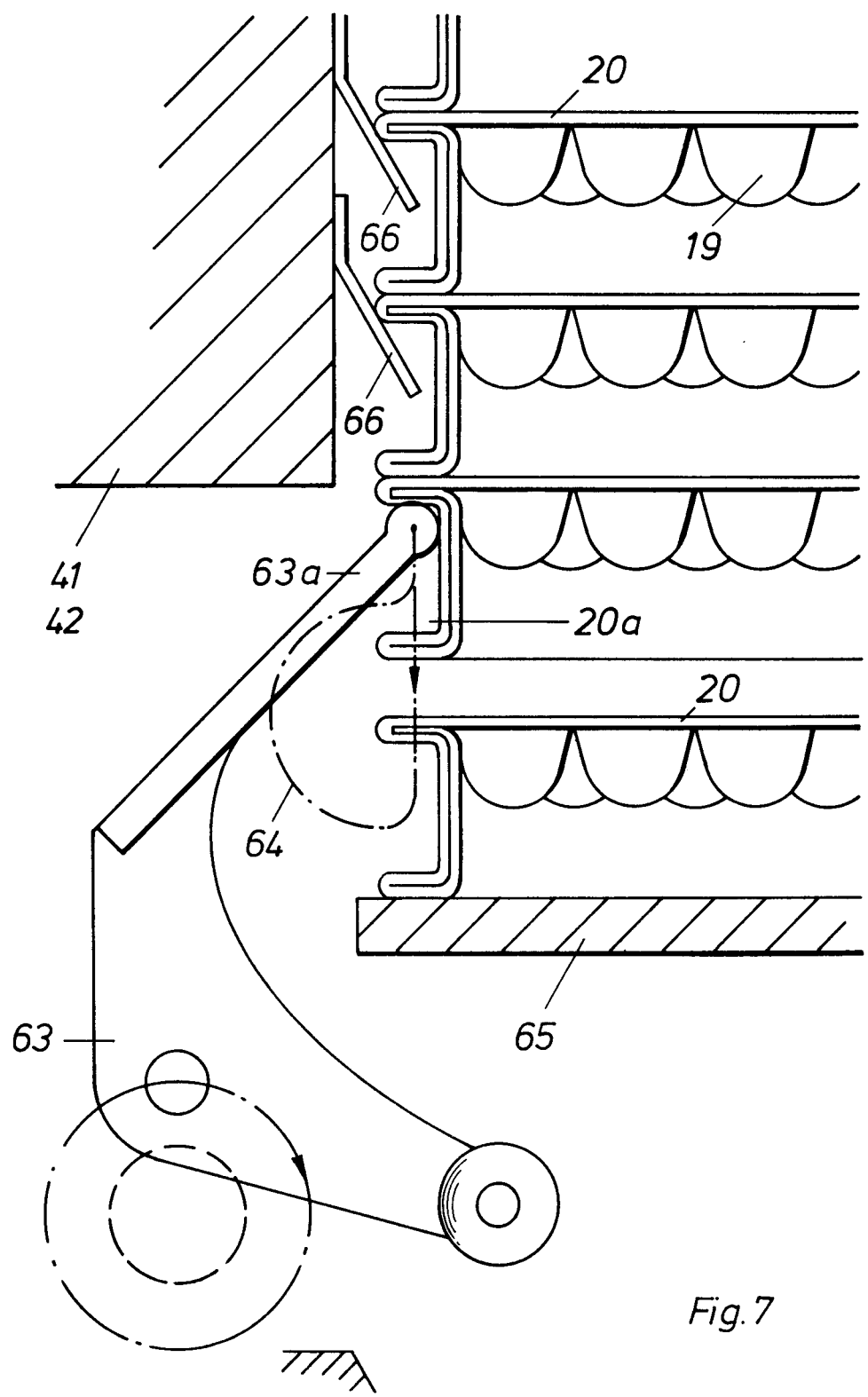
FIG. 7 shows a magnified section of the lower portion of the cupboard according to FIG. 6 comprising a means for supporting the stack of molding trough plates and for removing the lowermost plate from the stack.

The arrangement according to FIG. 5 shows likewise the funnel 1 of a dough dividing machine with associated discharge rollers 2, but the funnel in question extends beyond said discharge rollers 2 to strand shaping rollers 34, which, same as the discharge rollers 2, can be moved toward each other to form a flat strand which is moved along a guide sheet 36 until it arrives on the molding trough plate 20. As in the previous examples, the molding trough plate 20 is movably guided in the direction of the arrow 24 via an advancing drive not shown. The dough strand 35 is moved by the advancing of the molding trough plate 20 and by its own advance caused by the rollers 34 to the effective range of a pressing roller 38 rotatable about the axis 87 and also capable of being pivoted about the swivel point 39. The upper edges of the molding troughs 19 of the plate 20 shown in the example according to FIG. 7 are designed in the form of blades, so that dumplings 40 are formed by the action of the press roller 38 onto the dough strand 35. Said dumplings may then be transformed into spherical shape 14 by adequate means, for instance by the diagrammatically represented rotating means.

Figure 6:
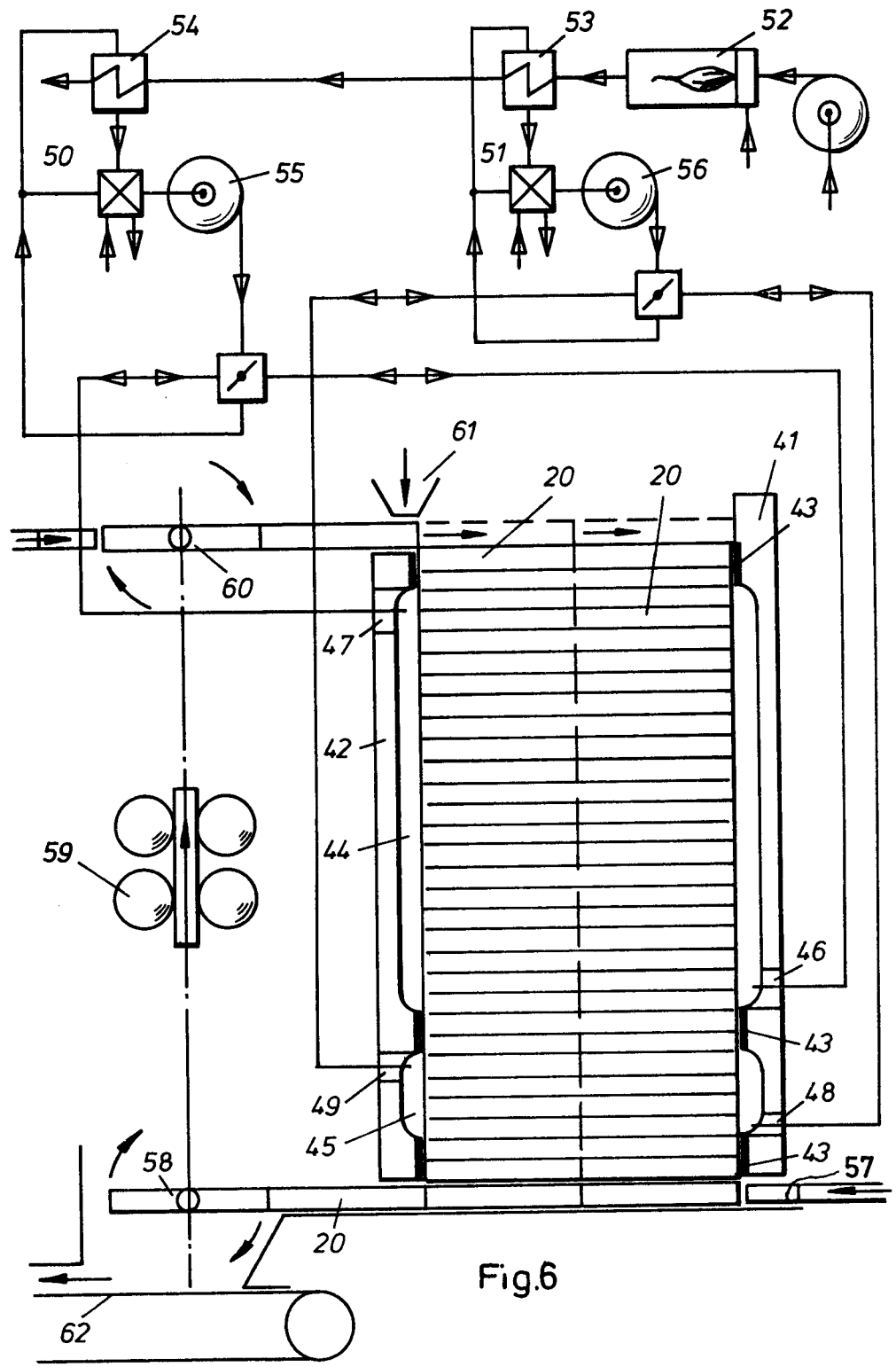
FIG. 6 is the schematic representation of a cupboard for final fermentation and the primary baking process.

FIG. 6 is a diagrammatic representation of a fermentation and primary baking cupboard. Said cupboard is provided with walls 41, 42 enclosing a shaft which can be filled with superpositioned molding trough plates 20, with additional sealing elements 43 being disposed at the side of the walls 41 and 42 facing the shaft. The shaft walls 41 and 42 are so constructed that, when the stack of molding trough plates 20 is inserted into the shaft, two chambers 44 and 45 are formed. The chambers 44 are provided with inlet and outlet openings 46 and 47 arranged at opposite sides of the stack of plates 20. In a similar way, inlet and outlet openings 48 and 49 are provided in the range of chamber 45. The inlet and outlet openings 46, 47 are connected with a controllable heating means, which as a whole is referred to as 50, whilst the inlet and outlet openings 48, 49 are connected with a further heating means which as a whole is referred to as 51. The two heating means 50 and 51 are associated with a common burner 52 from which the hot gases are conducted via heat exchangers 53 and 54. Said heat exchangers may also be electrically operated.

From the heating means 50 the heated gases or vapours conveyed by a blast 55 are guided to the chamber 44 from which, depending on the direction of flow, they are circulated via control valves either from the opening 46 to the opening 47 or, vice versa, transversely through the stack of molding trough plates 20, thus circumflowing the various molding troughs containing the dumplings, so that a quick and uniform heating of the dumplings to the respective desired temperature for final fermentation is obtained. In the same manner, a transverse current of the heating medium is guided by means of the blast 56 in the range of the chamber 45 through said chamber or through the interspace formed by the stacked molding trough plates 20, respectively, the heating gases in the range of chamber 45 being heated to a substantially higher temperature than in the range of chamber 44. In this way, in the range of the chamber 45 the primary baking process of the dumplings contained in the troughs 19 of the plates 20 is carried on until form stability of the dumplings is reached and crust formation has started. The height of the chambers 45 and 44 and the height of the entire shaft of the fermentation and baking cupboard is so adapted that, when the sheets stacked in the shaft are advanced downwardly, sufficient time will be allowed for both, the process of final fermentation and the primary baking process, it being possible within certain limits to control the period of time required for the afore-mentioned two process steps by adjusting the temperature.

The respective lowermost plate 20 of the stack contained in the fermentation and baking cupboard is relieved from the stack pressure in a manner to be more closely explained hereinafter and by means of an advancing device 57 is conveyed to a turnover arrangement 58 and emptied and, by means of a lifting conveyor not shown in detail and a further turnover arrangement 60 is moved into filling position and filled again by means of the dough dividing machine 61 diagrammatically indicated in FIG. 6, before it arrives again as uppermost sheet on the stack, from where it is conveyed downward during further advancing movement of the stack. On their way upward the molding trough plates 20 are guided through a brush station 59, wherein they are prepared for the new cycle. Below the turnover arrangement 58 there is provided a conveyor band 62 for removing the dumplings after completion of the primary baking process, said dumplings being either directly conveyed to a dosing means for further processing in molds or in the form of a continuous strand of goods to the second baking process, or else, it being also possible for the conveyor 62 to feed the dumplings at least partially to an apparatus for shock freezing and from there to a deep freezing shaft, wherein they are intermediately stored.

FIG. 7 shows in a magnified representation the possibility of the supporting and lowering means for the stack of molding trough plates 20 arranged in the cupboard for fermentation and primary baking.

In the illustrated example the supporting and lowering means consists of crank arms 63 engaging on either side of the molding trough plates 20, the upper supporting arm 63a thereof engaging laterally in conforming recesses 20a of the plates 20 and being movable by an adequate drive. The crank arm 63 relieves in the position represented in FIG. 7 the lowermost molding trough plate 20 from the stack pressure, so that said plate can be removed. In the course of the movement of the supporting arm 63a along the curve 64 the molding trough plate 20 supported as shown in FIG. 7 is placed on the base 65 and the supporting arm 63, during its upward movement, engages the lateral recess 20a of the molding trough plates 20 following next in the stack and slightly lifts the stack into the position reproduced in FIG. 7, so that the molding trough plate 20 placed on the base 65 can be removed again respectively discharged.

It can also be seen from FIG. 7 how the sealing zones 41, 42 according to FIG. 6 can be practically constructed. According to FIG. 7 they are made from spring elements 66 which in cooperation with the molding trough plates 20 form a labyrinth seal.

Figure 8:
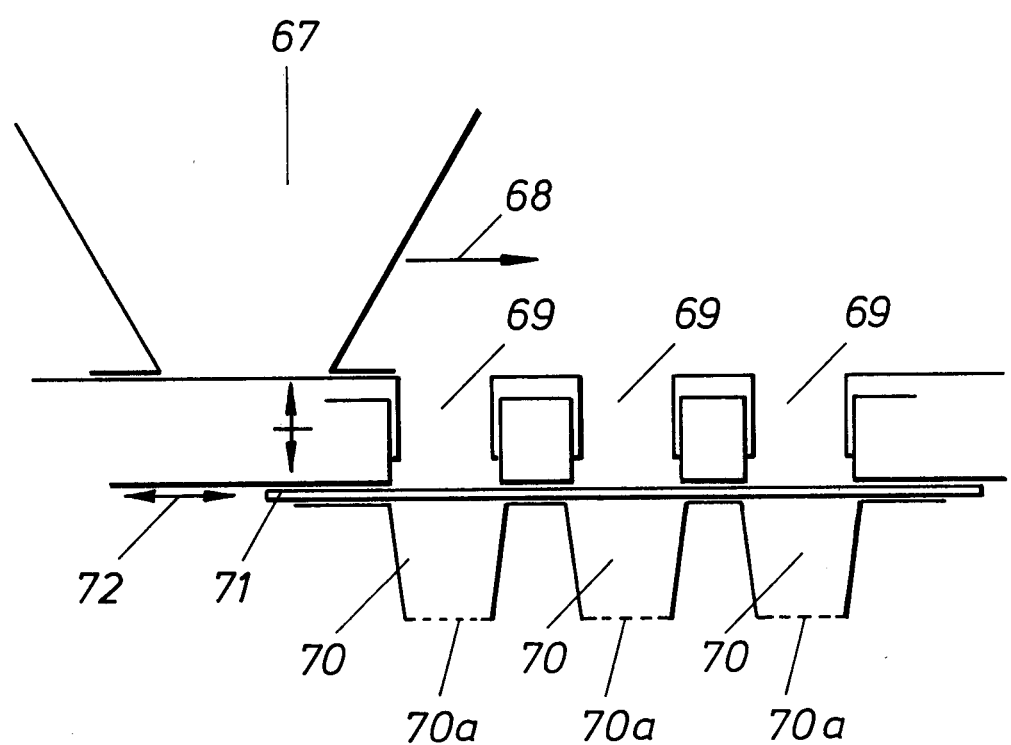
FIG. 8 shows a diagram of the construction of a dosing machine for transferring dumplings derived from the primary baking process into molds for the second baking process.

FIG. 8 is a diagrammatic representation of a dosing means for the filling of the molds, wherein the dumplings derived from the primary baking process are fed to the second baking process in the form of a bulky heap within said molds.

FIG. 8 shows a funnel 67 which can be moved in the direction of the arrow 68 and which during its feeding movement fills the dosing chambers 69 with dumplings arriving from the primary baking process, thereafter returning to its starting position. Below the dosing chamber there can be seen the molds 70 which in the exemplified embodiment are connected one to the other by an adequate shaping of the sheet and whose bottoms 70a are provided with flow openings. At their top side the molds 70 are primarily covered by a slide 71 movable in the direction of the double arrow 72. By actuation of the slide 71 the molds 70 can be filled with the dumplings contained in the dosing chambers 69 and transferred to the baking oven, the molds 70 being not filled to the brim with dumplings, leaving instead free space for the raising operation in the oven of the final baking process. The tops of the molds 70 may be covered with perforated lids not shown in the drawing in order to prevent the dumplings from being driven out of the molds due to the action of the flow medium during the gas flow operation to be described hereinafter.

Figure 10:
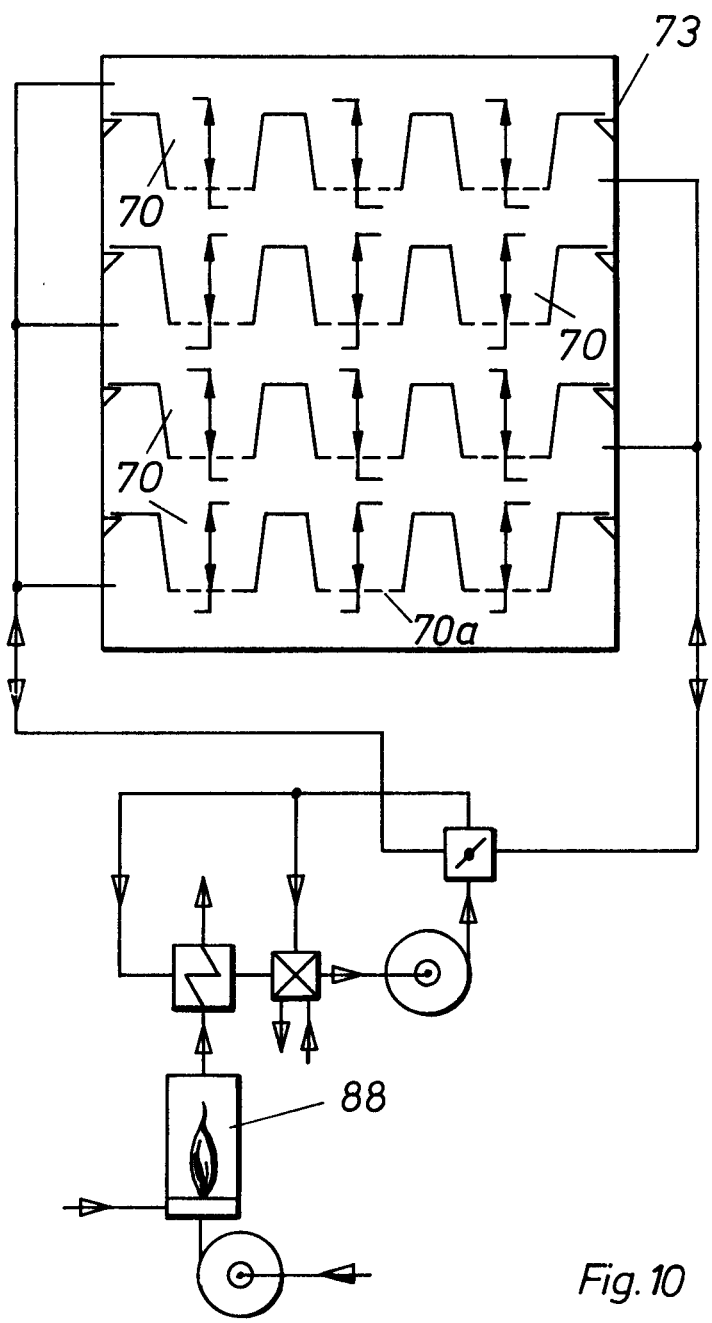
FIG. 10 is a diagram of a storey oven for the second baking process.

The second baking process for the dumplings fed to the molds 70 can take place, according to FIG. 10, in a storey oven reproduced purely schematically in FIG. 10. The molds 70 are flown through, according to the direction of flow, either from top to bottom or from bottom to top, by the thermal medium arriving from the heating circuit 88, which thermal medium may be gas and/or vapour. The direction of flow can be reversed according to the depicted arrows.

In the arrangement according to FIG. 10 there is provided a storey oven 73, which indicates only the principle of the arrangement of the molds and the way how they are flown through by the hot gases and/or vapours for the final baking process. In practice, it is advisable to arrange directly juxtapositioned molds in order to arrive at as favourable as possible a utilization of the individual storey surfaces. In its essential structure the design of the heating circuit 88 corresponds to the heating means 50 and 51 described in connection with FIG. 8. Also the heating circuit 88 permits a control of the temperatures and the adding of water and steam, respectively, to the heating medium in order to influence the second baking process in accordance with the respective demands.

In the second baking process the goods to be baked in the molds 70 will by the raising power of the oven increase in volume until the molds are filled, with an increased crumb formation and crust formation taking place within the heap of bulk goods contained in each mold, i.e. of the dumplings received from the primary baking process.

Figure 9:
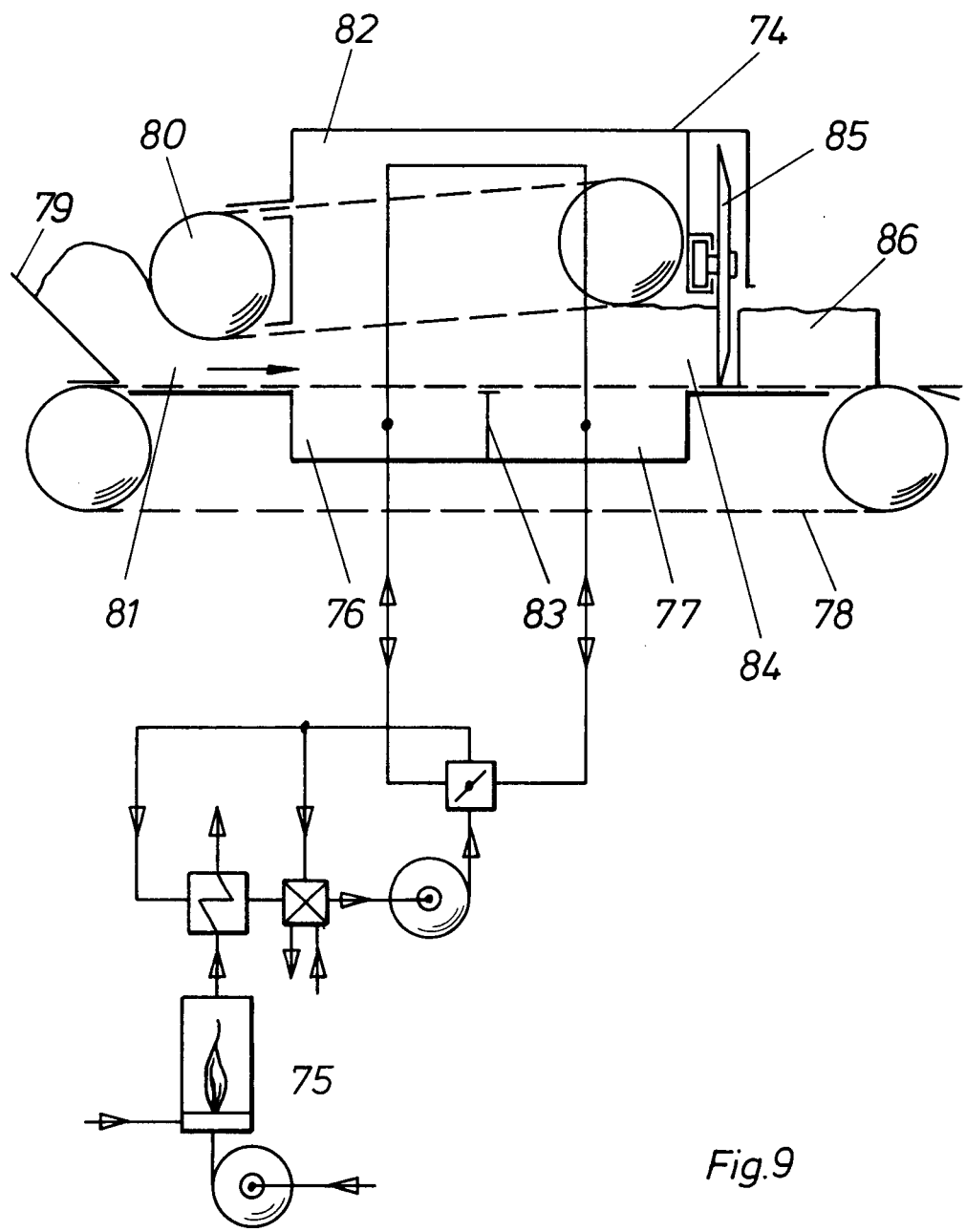
FIG. 9 is a diagram of a tunnel oven for the second baking process for making a baking strand or a plurality of baking strands.

Instead of carrying into effect a second baking process by means of molds capable of being flown through, it is also possible to subject a strand-like heap of bulk goods to the second baking process in a tunnel oven. Such an arrangement can be seen from FIG. 9. This figure shows a tunnel oven, which as an entity carries the numeral 74 and is connected with another heating means 75, by which the thermal medium can be conveyed to the spaces 76, 77 arranged below a conveyor band 78 capable of being flown through and conducted in longitudinal direction through the oven 74. The conveyor band 78, as shown on the left hand side of FIG. 9, is charged, via a filling funnel 79 and a conveyor band 80 cooperating therewith, with a layer 81 of the dumplings received from the primary baking process, there being arranged additional lateral walls not seen in the figure, in order to laterally confine the strand 84. It is possible to move through the tunnel oven 74 a plurality of parallel extending strands of dumplings separated by lateral separating walls.

Above the feeding chambers 76, 77 for the thermal medium there is arranged a collecting chamber 82 into which the conveyor band capable of being flown through extends and where it is reversed. It is in contact with the strand 84 and adds to the conveyance thereof.

Also in this arrangement it is possible to perform a reversal of the direction of flow through the strand and to adjust the temperature of the thermal medium to the respective desired values for the goods contained in the strand 84 subjected to the second baking process.

Subject to an adequate temperature regulation and conveying speed, the strand 84 can be continuously moved through the tunnel oven 74, at whose end it is divided into pieces 86 of predetermined lengths by means of a rotatably drivable knife 85.

Figure 11:
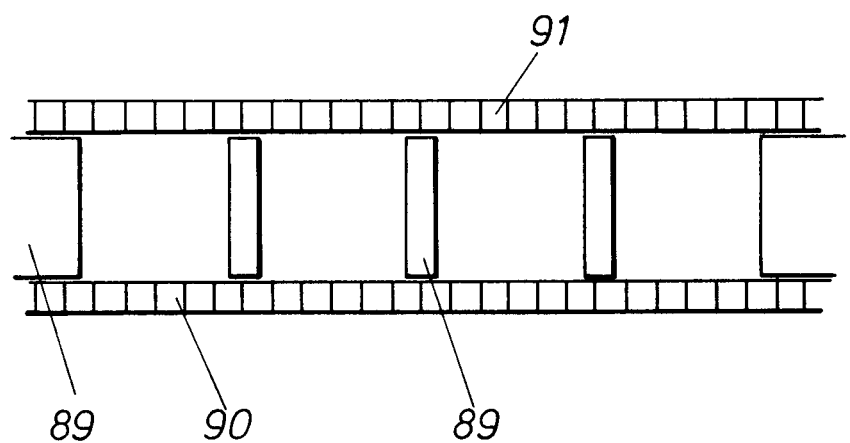
FIG. 11 is a plan view of a multiple mold.
Figure 12:
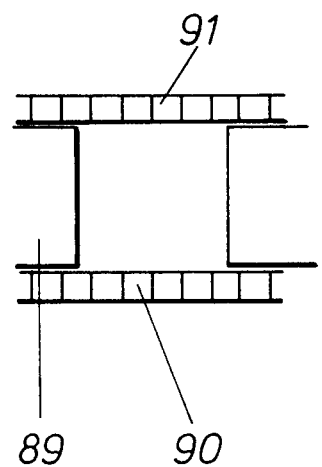
FIG. 12 is a magnified section of the multiple mold according to FIG. 11.

In FIG. 11 there is represented a covered multiple mold in the form of a flow chamber having solid lateral and intermediate walls 89 and a perforated bottom 90 as well as a similarly perforated lid 91. FIG. 12 represents a single mold (same as FIG. 11). Filling of the mold can best be performed by removing a lateral wall 89. It is therefore not necessary to open the system of flow. The functions of bottom 90 and lid 91 can also be taken over by conveyor bands 78, 80 (FIG. 9).

The arrangements reproduced in the described figures represent but fundamental embodiments of the apparatus for carrying into effect the method, wherefore only essential elements have been reproduced in the drawings and explained in the description.

Figure 13:
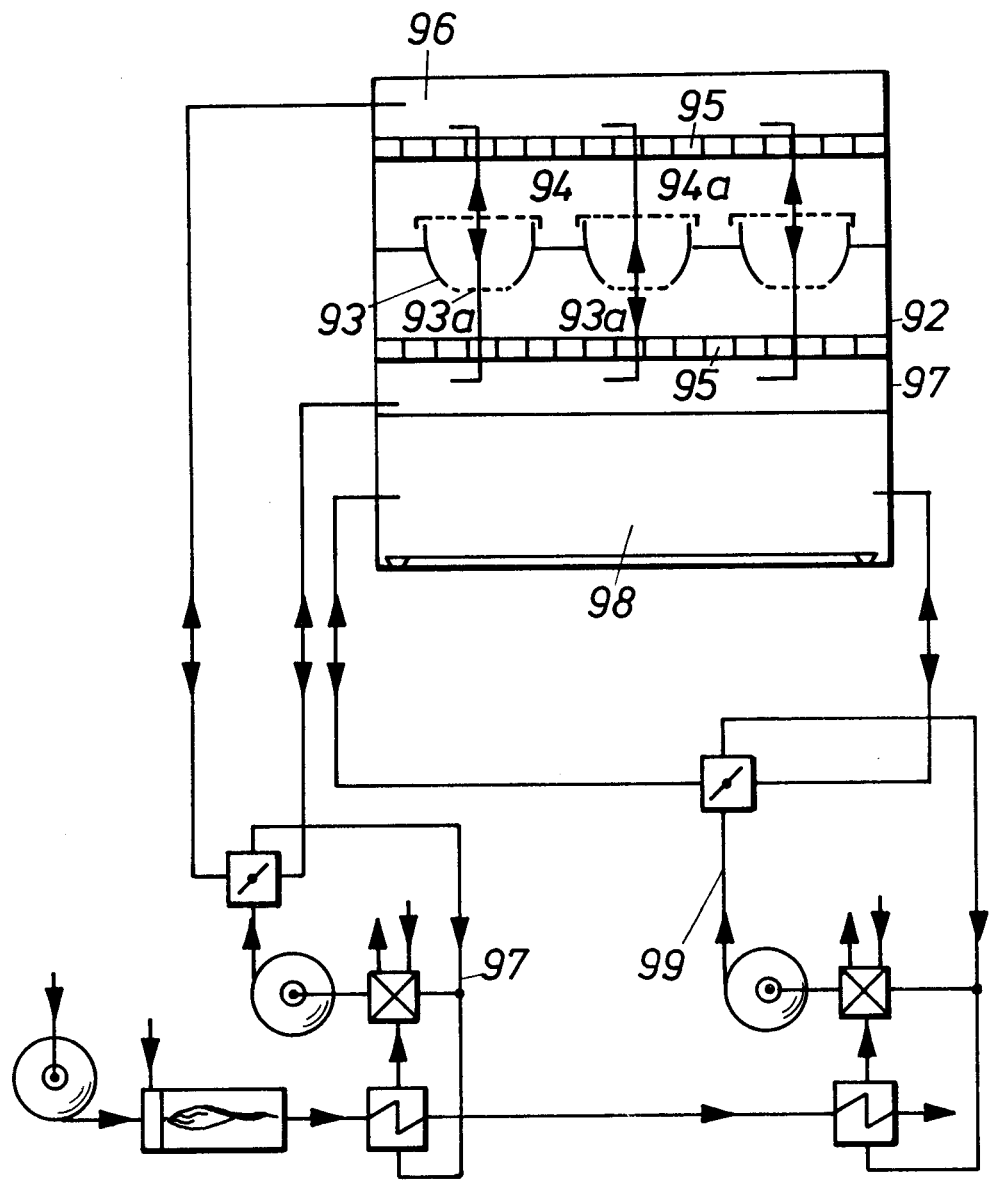
FIG. 13 is a diagram of a baking oven similar to that of FIG. 10.

In the arrangement according to FIG. 13 the baking oven 92 is equipped with a means for receiving a mold referred to as an entity by reference numeral 93. This mold is provided with a plurality of box-shaped recesses adapted to the shape of the product to be baked and in the bottom area 93a thereof shows perforations and is covered with a lid 94 likewise provided with perforations 94a.

Above and below the mold 93 there are provided flow resistance means 95 for balancing the inflow and outflow of the thermal medium, for instance in the form of perforated plates. These plates separate the baking space proper from the inflow and outflow chambers 96 and 97, respectively. The afore-mentioned chambers, again, are connected with a heating means 97 resembling that described in FIGS. 9 and 10.

In the figure there is further indicated a subsequent baking chamber 98 which is connected with a further heating means 99 and wherein, if required or desired, the subsequent baking procedure of the respective products can be performed. The heating means 97 and 99 are provided in the previously described manner with adequate control and regulating means for temperature, humidity and the like.

Figure 14:
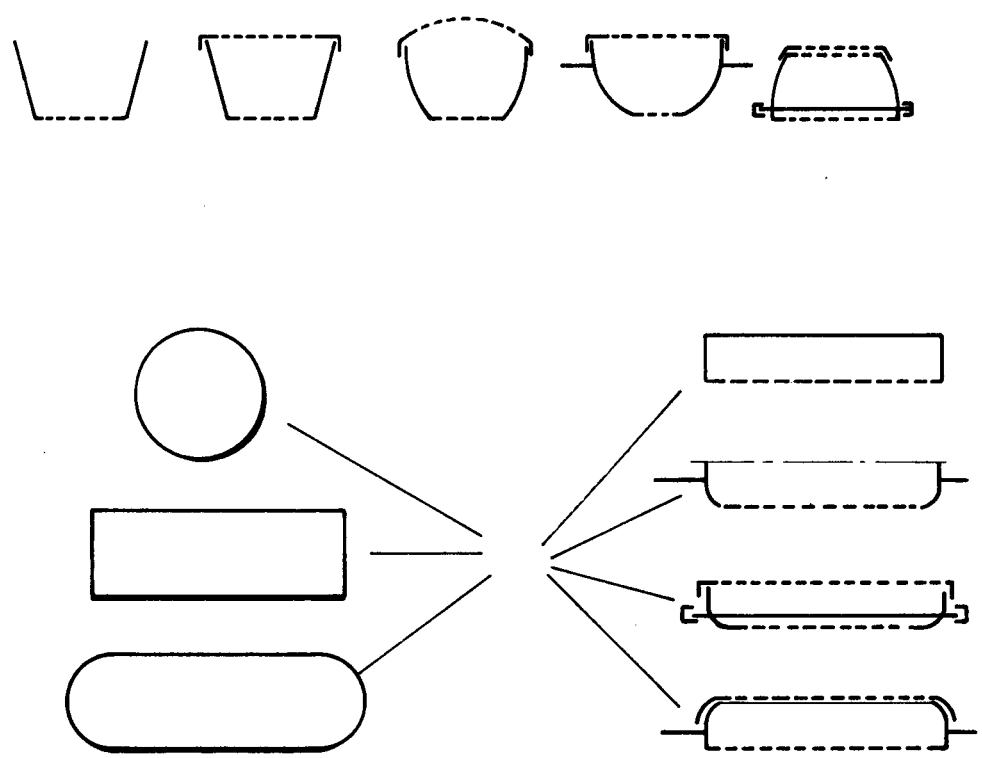
FIG. 14 is a diagram of various molds for the baking of bread.

FIG. 14 is a schematic representation of the various functional baking molds for the manufacture of bread, it being shown by the dotted lines in the various simplified reproductions of the molds in which of the walls apertures for the passage of the gaseous medium are provided. In the depicted molds the upper defining walls may be designed as lids applied onto the same which, if desired, can be locked with the bottom portions of the mold.

While the above exposition relates to the baking of dumplings arranged in a plurality of layers consisting of an orderly or disorderly arranged heap, it is likewise possible according to the same procedure to produce baked goods in a single-layer arrangement of the dumplings, in which case the dumplings are subjected to the second baking process according to a predetermined principle or order, especially in molding troughs, such as stated in detail in claim 34. This method provides that the dumplings are subjected to final fermentation and to the primary baking process in an entirely enclosed mold or in a single-layer array in molding troughs capable of being flown through by the thermal medium. The enclosing molds may also be employed in the method for making a baked product from a multilayer heap.

The baked product comprising dumplings in a single-layer array is especially suited for instance for pizza bottoms or other baked pastry cases destined for topping, or for the manufacture of flat baked products, such as flat bread or the like.

Figure 15A:
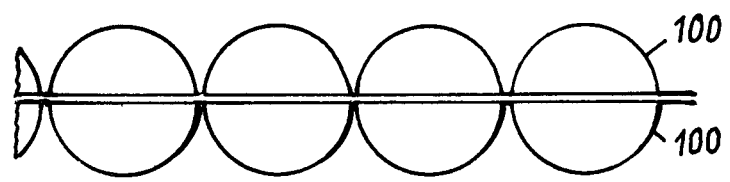
FIGS. 15a and 15b are representations of a completely enclosed mold for the primary baking process and of a single-layer mold for the second baking process.
Figure 15B:
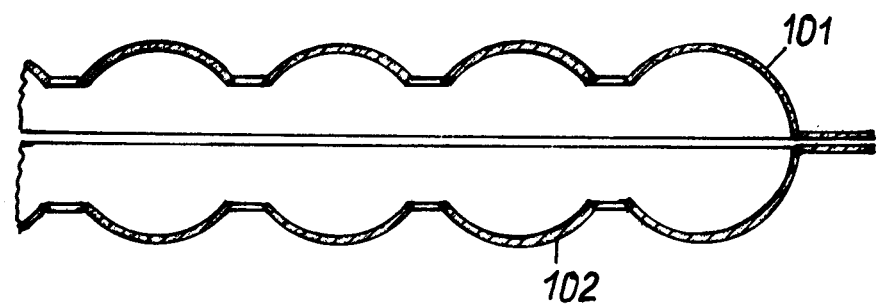

FIG. 15a shows trough sheets 100 which form an entirely enclosing mold or permit an encasement of the dumplings for the multiple and primary baking processes. The trough sheets are flown through in the described manner by a thermal medium. For the making of a single-layer baked product a mold capable of being flown through and consisting of the two sections 101 and 102 is shown in a sectional view in FIG. 15b, wherein the dumplings, accomodated according to a principle of order determined by the molding troughs, are subjected to the second baking process. The dumplings will then unite to form a single-layer product. The baked product may have any optional cross-sectional shape and, by an adequate design of the mold members, may also have a reinforced or upwardly drawn rim. It is self-explanatory that the molds represented in FIGS. 15a and 15b must be so adapted to the respective dimensions of the dumplings that their expansion is not impeded by the mold towards the end of the treatment.

I claim:

1. A method of manufacturing a baked final product, comprising the steps of:
mixing flour, additives, and water into a dough;
allowing the dough to rest;
dividing and shaping the dough into separate dumplings, each dumpling having a volume small compared to the volume of the final product;
introducing the dumplings in one layer into molding troughs;

exposing the dumplings in the troughs to flowing gaseous and/or vaporous thermal media in a fermentation room;

subjecting the separate dumplings to a first baking process until they have reached a state of form stability with a thin skinlike coating being formed or a crust beginning to develop;

arranging subsequently the thus treated dumplings into a bulky heap in which the dumplings are piled on top of each other, whereby there will be defined gaps between the dumplings forming interspaces for gases to flow therethrough; and thereafter, in a second baking process passing hot gases and/or vapor through the interspaces of the bulky heap until the dumplings are baked to one another and the gaps formed between the dumplings are partially or fully filled and wherein the bulky heap is subjected to the second baking process for a time sufficient to complete crust formation, whereby the dumplings will be extended to have a substantially uniform structure throughout the entire cross-section of the final product.

2. The method as claimed in claim 1 wherein the dumplings have a diameter of from about 10 to 24 mm.

3. The method as claimed in claim 1 wherein the dumplings are of approximately spherical configuration.

4. The method as claimed in claim 1 comprising transforming any dumplings having a configuration deviating from a spherical shape into a spherical shape.

5. The method as claimed in claim 1 comprising covering the dumplings from a strand of dumplings with an outer layer made from another dough.

6. The method as claimed in claim 1 comprising shaping the dumplings during piece fermentation and first baking process in molding troughs by their conforming to said troughs.

7. The method as claimed in claim 1 wherein in the making of bread or rolls it comprises heating the dumplings to a temperature of from 30° to 50° C. in the piece fermentation process with a relative atmospheric humidity of from 50 to 90% of the vaporous or gaseous thermal medium and with a flow velocity of the thermal medium of approximately 0.3 to 1 meter per second.

8. The method as claimed in claim 1 comprising heating or cooling the dumplings prior to or after the first baking process in a shocklike manner by overcharging the temperature of the gaseous and/or vaporous thermal medium.

9. The method as claimed in claim 1 further comprising cutting or likewise damaging the the surface of the dumplings after the primary baking process.

10. The method as claimed in claim 1 comprising storing the dumplings at a deep-freezing temperature of about $-18°$ C. after the first baking process.

11. The method as claimed in claim 1 comprising moistening the surfaces of the dumplings after the second baking process by means of drinking water or by means of gaseous and/or vaporous thermal media having a high humidity content.

12. The method as claimed in claim 1 comprising wetting or spraying with a starch glue, especially prepared from drinking water and starch, the content of the starch ranging from 3 to 10% related to the drinking water, or with other substances having adhesive properties and serving for human nutrition, such as sugar, honey, treacle and the like, the surfaces of the dumplings prior to the second baking process.

13. The method as claimed in claim 1 comprising applying onto the surfaces of the dumplings after the first baking process by means of starch glue or the like lumpy additives such as poppy seeds, sesame, caraway seeds or such additives as pumpernickel crumbs, crushed grain.

14. The method as claimed in claim 1 comprising employing in the second baking process only dumplings of the same dimensions.

15. The method as claimed in claim 1 comprising employing in the second baking process dumplings of different dimensions.

16. The method as claimed in claim 1 comprising selecting dumplings according to their size in the second baking process; and arranging the dumplings in a specific sequence in horizontal layers.

17. The method as claimed in claim 1 comprising using in the second baking process dumplings made from different grain flour products.

18. The method as claimed in claim 1 comprising blending the dumplings prior to the second baking process with lumpy additives of larger size such as desiccated fruit, nuts or the like.

19. The method as claimed in claim 1 comprising conveying the dumplings for the second baking process through the baking zone as a bulky heap in the form of a continuously moving strand by means of a support streamed through by the hot gases or vapors in a direction transversely of the strand; and dividing the strand after the second baking process.

20. The method as claimed in claim 1, further comprising the steps of transferring the dumplings for the second baking process as a bulky heap into a mold, wherein hot gases and/or vapors pass through said mold and said mold has a perforated bottom in the form of a sieve and impermeable lateral walls; and introducing the dumplings rigidly supported in said mold into the baking zone.

21. The method as claimed in claim 1 comprising cooling in the second baking process the surfaces of the dumplings at intervals down to surface temperatures below 100° C;

moistening the surfaces at these temperatures by means of gaseous and/or vaporous thermal media having a high humidity content; and immediately subjecting the dumplings after moistening of their surfaces to the baking temperature destined for the baking process by the thermal medium.

22. The method as claimed in claim 1 comprising adjusting the inflow and outflow velocity of the hot gases or vapors for flowing through the bulk heap in the second baking process to values ranging from 0.5 to 4 m/s.

23. The method as claimed in claim 1 comprising flowing a unidirectional current through the bulky heap formed by the dumplings in the second baking process.

24. The method as claimed in claim 1 comprising flowing a current in opposite directions in a periodically alternating sequence through the bulky heap formed by the dumplings in the second baking process.

25. The method as claimed in claim 1 comprising flowing through the bulky heap formed by the dumplings with the hot gases and/or vapors at intervals.

26. The method as claimed in claim 1 comprising subjecting the baked product formed in the second baking process to a subsequent baking process.

27. The method as claimed in claim 1, wherein the first baking process includes the step of baking the divided and shaped dough at a temperature range from 130° C. to 400° C.

* * * * *